Dec. 12, 1972
C. H. SAVIT
3,706,069
METHOD OF GEOPHYSICAL PROSPECTING BY MEASURING
THE ATTENUATION OF SEISMIC WAVES IN THE EARTH
Filed June 18, 1970
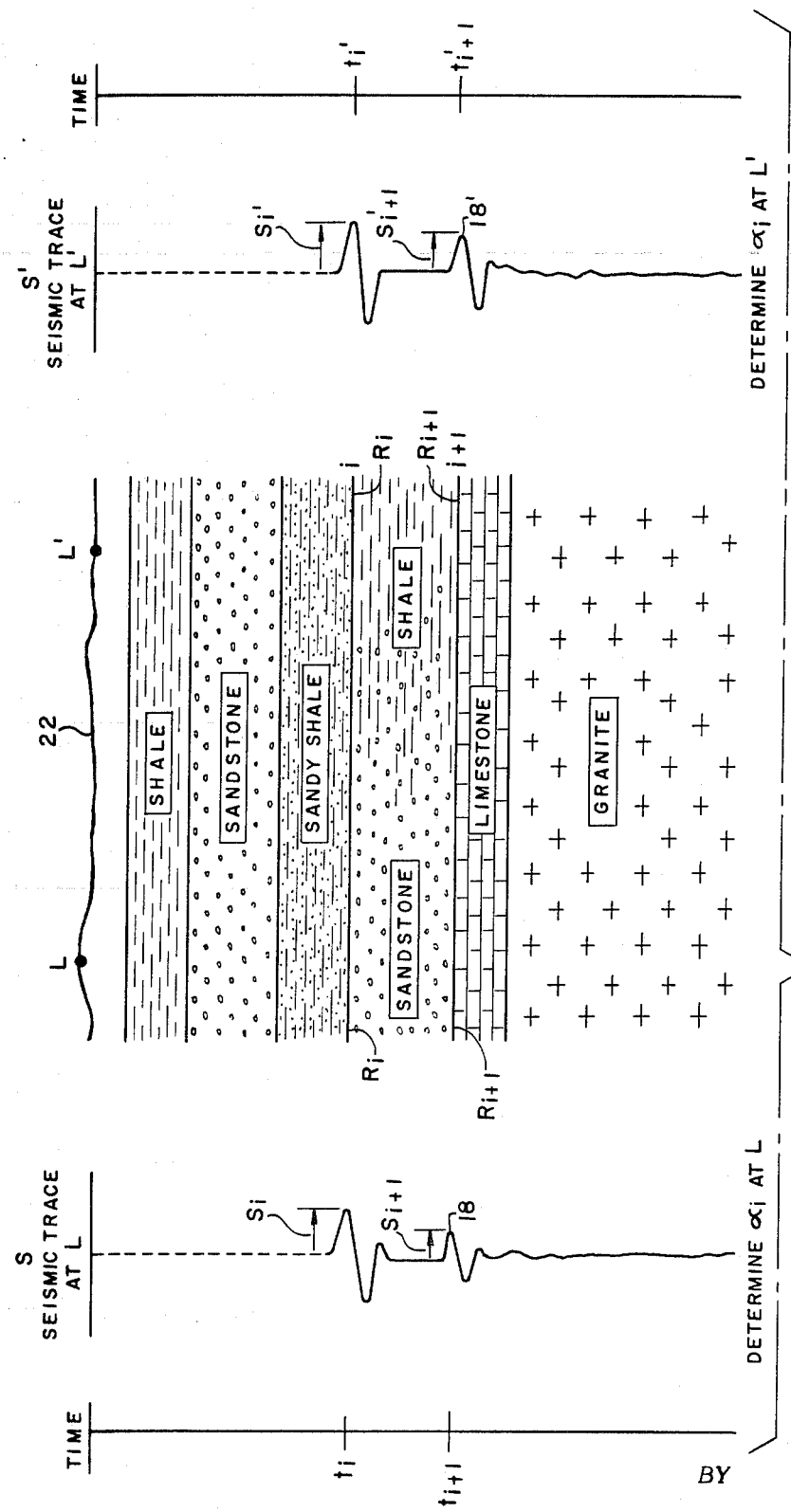
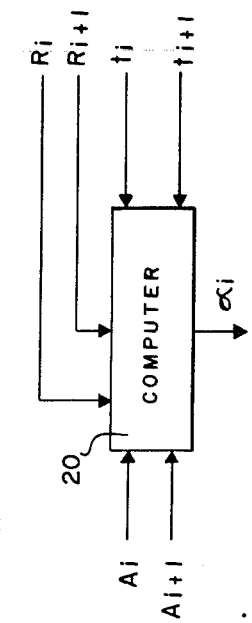
CARL H. SAVIT,
*INVENTOR.*
BY
MICHAEL P. BRESTON
*ATTORNEY.*

United States Patent Office
3,706,069
Patented Dec. 12, 1972

3,706,069
METHOD OF GEOPHYSICAL PROSPECTING BY MEASURING THE ATTENUATION OF SEISMIC WAVES IN THE EARTH
Carl H. Savit, Houston, Tex., assignor to Western Geophysical Company of America, Houston, Tex.
Filed June 18, 1970, Ser. No. 47,415
Int. Cl. G01v 1/30
U.S. Cl. 340—15.5 CP                 5 Claims

ABSTRACT OF THE DISCLOSURE

This invention contemplates a method of seismographic exploration by recording reflection seismic signals and obtaining a measure of the signal attenuation between two reflecting interfaces of the geologic strata.

BACKGROUND OF THE INVENTION

In seismic exploration of the earth by the reflection method it has been customary to initiate a seismic disturbance at or near the surface of the earth (or at sea, at or near the surface of the water), and to detect and record the amplitude of the returning, reflected seismic signals by means of arrays, detectors, and recording apparatus well known in the art.

Hitherto, the amplitude information in the reflected seismic signals has been used only to detect, define, and delineate major subterranean discontinuities between different rock layers. That is, when the amplitude of a seismic signal is found to be somewhat greater than that of the background signal, it is assumed that such an anomalous amplitude is evidence of the reflection of seismic waves from such a discontinuity. Persistence of such an increased amplitude among successive positions along a line of survey is taken as confirmation of the existence of a discontinuity, comprising an extensive surface, between two different rock formations.

In the prior art no attempt was made to determine the nature of the rocks involved. All of the displays and the analysis of the seismograph data are based solely on the rock-strata configurations determined from a knowledge of the location and orientation of the discontinuities. Identification of lithology or rock type is confined to information obtained at outcrops or in drilled wells. Persistence of lithological identity along strata delineated by the seismic method is generally assumed.

A given stratum is laterally continuous by reason of having been laid down or formed contemporaneously throughout its lateral extent. It is, however, well known that economically significant accumulations of petroleum or natural gas are frequently identified with lateral changes in the lithologic character of a stratum. To detect changes in the lithology of a stratum by use of reflection seismic data has long been a desideratum of the exploration industry.

It is well known that one physical property of a rock type which depends upon lithologic character is the rate of attenuation undergone by an acoustic or seismic wave as it traverses a rock of that type.

SUMMARY OF THE INVENTION

This invention contemplates determining from seismic reflection data the characteristic attenuation parameters of at least some of the strata traversed by reflected seismic waves.

This invention also provides a method of distinguishing among rock types traversed by seismic waves on the basis of parameters derived from the variations of the amplitude of those seismic waves.

BRIEF DESCRIPTION OF THE DRAWINGS

FIG. 1 is a diagrammatic representation of a typical geologic section undergoing seismographic exploration; and FIG. 2 represents a digital computer adapted to carry out the mathematical operations required for obtaining a measure of the attenuation of the waves traversing through the strata in the geologic section of FIG. 1.

Attenuation undergone by a seismic wave in traversing a given rock stratum is manifested by a decrease in the amplitude of the seismic wave in excess of the decrease in amplitude as a result of geometric spreading. Geometric spreading is explained by the observation that if a sound wave is initiated at a point in a homogeneous, isotropic medium, that sound wave will radiate in the form of an expanding spherical wave front whose center is at the point of initiation. Since the medium cannot add energy to the sound wave, and if the medium is perfectly elastic so that it does not subtract energy from the sound wave, the energy in the wave will remain constant. Since, however, the spherical wave is expanding and the total energy must remain constant while being distributed over an ever larger surface, the energy passing through a unit area of the sphere will decrease in inverse proportion to the surface area of the sphere. A given detector of fixed area will, therefore, detect the sound wave at an energy level inversely proportional to the area of the sphere. Since it is proved in classical solid geometry that the area of a sphere is directly proportional to the square of the radius, it follows that the detected energy is inversely proportional to the square of the distance from the point of initiation to the detector.

Also, since the medium is assumed to be homogeneous, the distance traversed by the sound wave is the product of the velocity of sound in the medium by the travel time of the sound wave.

Therefore, the energy E at any unit area on the expanding wave is $$E = kt^{-2} \qquad (1)$$

where $t$ is the travel time and $k$ is a constant of proportionality.

If now the medium is still perfectly elastic but not homogeneous, this same relationship between energy and real time can be shown to be a reasonably accurate description of the actual geometrical spreading effect. Likewise, it can be shown that, on the average, the amplitude of a sound wave is proportional to the square root of its energy so that one finally arrives at the working formula $$A = k'/t \qquad (2)$$

where A is the amplitude of the sound wave and $k'$ is another constant of proportionality. This relatitonship is well known to be valid even after the sound wave has undergone specular reflection, provided that the corresponding reflection coefficient is equal to unity.

For purposes of clarity, the following description is written on the basis that sound waves traversing or being reflected from a discontinuity or interface are substantially perpendicular to that interface. This is termed the case of "normal incidence." Generalizations of the equations and procedures given below to cases of non-normal incidence are well known and will be apparent to those skilled in the art of seismology.

In the case of rock strata in a real geologic section, the individual strata are generally assumed to be vertically homogeneous and subject to gradual lateral variations. Reflection coefficients at the interfaces between strata are never equal to one but have a substantially lower value which rarely exceeds 0.1.

It is thus clear that sound wave amplitudes will be reduced not only by geometrical spreading but also by the losses of energy upon reflection. An additional loss is produced on transmission through an interface because a part of the energy is reflected and another part is converted from a longitudinal acoustic wave to transverse waves of various sorts. This loss is relatively insubstantial at normal incidence and may be calculated in non-normal incidence cases from a knowledge of velocities and an estimate of Poisson's ratio.

Any energy lost by the reflected sound wave, over and above the losses from geometrical spreading, partial reflection, and mode conversion, is assumed to have been dissipated in traversing the individual rock strata. Such losses are here termed attenuation losses, and the relative loss is proportional to the distance traversed. The constant of proportionality is known as the attenuation coefficient and is ordinarily given in units of nepers per meter. Thus, $$dE/E = -(a)ds \quad (3)$$

where $a$ is the attenuation constant of the medium and $s$ is the distance traversed by the wave in the medium.

It therefore follows that, $$E = c \exp(-as) \quad (4)$$

where $c$ is a constant of integration. Finally, on converting to variables of amplitude and time as above, one obtains $$A = \exp(-\alpha t + \beta) \quad (5)$$

where $\alpha$ is proportional to $a$, and $\beta$ is a constant.

This invention, therefore, comprises a method of obtaining from seismic reflection data an estimated value of the attenuation parameter $\alpha$ for the medium between two discontinuities. Fundamentally such a determination is made by obtaining the ratio of the amplitudes of two seismic reflections received at the same position along a line of survey but separated from each other in total travel time.

Thus if two reflection events occur at times $t_i$ and $t_{i+1}$ and have idealized amplitudes $A_i$ and $A_{i+1}$, the ratio is $$A_{i+1}A_i = \exp \alpha(t_i - t_{i+1}) \quad (6)$$

from which $$\alpha = 1/t_{i+1} - t_i[\ln(A_{i+1}/A_i)] \quad (7)$$

Thus the attenuation parameter $\alpha$ applicable to that portion of the geologic section between reflecting interfaces corresponding to times $t_i$ and $t_{i+1}$ is obtainable from the ideal quantities $A_i$, $A_{i+1}$, and the observed times $t_i$, and $t_{i+1}$.

However, in actual practice the observable amplitudes of the reflections from the two disontinuities are not representative of the amplitudes which would obtain in the absence of geometrical spreading and, in the idealized case, of perfect reflection. It is therefore necessary that both geometrical spreading and reflection coefficient values be taken into account before applying Equation 7.

In a commonly used reflection seismic exploration procedure, seismic signals are recorded by the well-known digital, binary-gain method in which detected seismic amplitudes are recorded in a code which is equivalent to floating point notation and is thus capable of preserving the full range of received amplitudes.

To practice the present invention it is necessary to obtain (at least up to a multiplicative constant) the actual values of signal amplitudes. It is therefore a preferred practice to use binary-gain recording and not to apply any automatic volume or gain controls. Even the use of programmed gain is preferably to be avoided, as errors may be introduced by use of programmed gain and the consequent application of a gain recovery procedure.

In editing seismographic data for use in the present invention, it is preferred to retain the data in floating point (or binary gain) form throughout the preparatory stages of processing and to apply only a geometric spreading correction as, for example, by multiplying all amplitudes by the reflection time.

If no gain or amplitude compensation, except that for geometric spreading, has been applied to the data, it will be presumed that all amplitude variations remaining are attributable to attenuation and to reflection coefficients less than unity.

To remove the effects of reflection coefficients at rock strata interfaces in a presently preferred embodiment of this invention one first employs the well-known method of normal-moveout analysis to determine average velocities from the earth's surface to a sequence of interfaces in the geologic section. It should be understood that the particular method of determining seismic velocity forms no part of this invention. Normal-moveout analysis is described, for example, by the following references:

Dix, C. Hewitt, 1952, Seismic Prospecting for Oil, New York, Harper & Brothers, 414 p.;

Musgrave, Albert W., 1962, Applications of the Expanding Reflection Spread, Geophysics, v. XXVII, No. 6, p. 981; and Taner, M. Turhan and Koehler, Fulton, 1969, Velocity spectra-digital computer derivation and applications of velocity functions, Geophysics, v. 34, No. 6, p. 859.

Referring now to FIG. 1, there is shown a geologic section 10, in which the interfaces 1, 2, 3 ... n are designated with corresponding vertical reflection times $t_1$, $t_2$, ... $t_n$ and corresponding average velocities from the surface 12 of $V_1$, $V_2$, $V_3$ ... $V_n$. The depth $z$ below the surface at the $i^{th}$ interface will be $$z_i = \tfrac{1}{2} t_i V_i \quad (8)$$

From Equation 8 it follows that $$V_i = \frac{z_{i+1} - z_i}{1/2(t_{i+1} - t_i)} = \frac{t_{i+1}V_{i+1} - t_iV_i}{t_{i+1} - t_i} \quad (9)$$

where $V_i$ is the velocity in the rock stratum between interfaces $i$ and $i+1$.

To find the reflection coefficient at the $i^{th}$ interface one determines the velocity $V_{i-1}$ in the stratum immediately above the interface and the velocity $V_i$ in the stratum immediately below. The reflection coefficient $R_i$ at the $i^{th}$ interface is then given by the well-known formula $$R_i = \frac{\rho_i V_i - \rho_{i-1} V_{i-1}}{\rho_i V_i + \rho_{i-1} V_{i-1}} \quad (10)$$

where $\rho_i$ is the density of $i^{th}$ stratum.

In most cases it is adequate to assume that the two densities $\rho_{i-1}$ and $\rho_i$ are equal. If, however, approximate values of $\rho_{i-1}$ and $\rho_i$ are available from a knowledge of the general geology of the area or from neighboring drilled wells or otherwise, such approximate values may advantageously be used in Equation 10 with the previously derived values for $V_i$ to determine the reflection coefficients $R_i$.

When the reflection coefficient of the $i^{th}$ interface is not the actual observed reflection amplitude (corrected for geometrical spreading) then $S_i = R_i A_i$ where $A_i$ is, as above, the reflection amplitude corrected for both geometrical spreading and the reflection coefficient at the $i^{th}$ interface. It then follows that $A_i = S_i/R_i$ and by subjecting into Equation 7, $$\alpha = \frac{-1}{t_{i+1} - t_i} \ln \frac{R_i S_{i+1}}{R_{i+1} S_i} \quad (11)$$

The value $\alpha$ for any layer between two interfaces is thus determinable from observed quantities and may be used in the form of a display similar to that of a conventional record section of seismic amplitudes by substituting the so obtained values of $\alpha$ for the conventional amplitude values. The computations may alternatively be made (as is well known in the art) to yield other measures of attenuation such as, for example, the logarithmic decrement.

Alternatively, the attenuation values may be displayed in conjunction with other values as more completely described in copending application Ser. No. 853,467 assigned to the same assignee.

In FIG. 1 the geologic section which includes shale, sandstone, sandy shale, shale, sandstone-and-shale, limestone, granite, etc., provides a seismic S trace which is obtained for location L on the earth's surface and another seismic S' trace for location L'. From these seismic S traces along a line of survey 22 it is possible to determine the attenuation coefficient for the desired layer between the $i^{th}$ and the $(i+1)$ interfaces in accordance with Equation 11. The mathematical manipulations required by the Equations set forth above can be conveniently carried out by a computer 20 as shown in FIG. 2. The inputs to the computer 20 are $A_i$, $A_{i+1}$, $t_i$, $t_{i+1}$, $R_i$ and $R_{i+1}$. Alternatively these computations can be buried out by hand with the use of logarithm tables.

In sum, the conventional recordings of the amplitude traces are used first to delineate subterranean discontinuities and to then obtain the corresponding seismic S curves for the line of survey 22. From the S curves it is therefore possible to obtain confirmation of the existence of lateral variations or discontinuities in the lithologic characteristics, as for example, between the $i^{th}$ and the $(i+1)$ interfaces (a change from sandstone to shale). It will be noted that the amplitude 18 of the S curve at the L location is attenuated to a greater extent than the corresponding amplitude 18' of the S' curve at the location L', since the sandstone portion attenuates the waves more than the shale portion.

What I claim is:
1. A method of seismographic exploration over the surface of the earth by determining a measure of the attenuation of propagation of reflected seismic waves in a layer of the earth studied comprising the steps of:
   propagating acoustic waves through said layer from two spaced-apart stations positioned substantially on the earth's surface;
   detecting at each station the reflected seismic signals from the upper boundary of said layer and from the bottom boundary of said layer; and
   measuring the ratio of the amplitudes of the received reflected signals to obtain a value for the attenuation of the reflected signals through said layer.
2. The method of claim 1 wherein,
   said measure of the attenuation is corrected for the reflection coefficients at said upper and lower boundaries.
3. A method of seismographic exploration over the surface of the earth by determining a measure of the attenuation of reflected seismic waves in a layer of the earth studied, comprising the steps of:
   propagating acoustic waves through said layer from at least one transmission station positioned substantially on the surface of the earth;
   detecting at an observation station substantially on the surface of the earth the reflected seismic signals from the upper boundary of said layer and from the bottom boundary of said layer;
   measuring the ratio of the amplitudes of the received reflected signals to obtain a value for the attenuation of the reflected signals through said layer, and
   correcting said value for the reflection coefficients at said upper and lower boundaries.
4. A method of seismographic exploration by determining the variation of the attenuation coefficient in a layer of earth studied comprising the steps of:
   propagating through said layer from two stations spaced from each other acoustic waves forming transmission signals;
   detecting at each station the amplitudes of the reflected seismic signals from the upper boundary of said layer and from the bottom boundary of said layer;
   recording the detected reflected seismic signals;
   adjusting the amplitudes of the recorded seismic signals to compensate for geometric spreading;
   measuring the times of occurrence of the reflected seismic signals from said upper and lower boundaries;
   determining the logarithm of the ratio between said amplitudes; and
   dividing said logarithm by the difference between said occurrence times to obtain a measure of the variation of the attenuation of said signals propagating through said layer.
5. The method of claim 4 wherein,
   the amplitude of the reflected signal at said upper boundary is divided by the reflection coefficient at said upper boundary;
   the amplitude of the reflected signal at said bottom boundary is divided by the reflection coefficient at said bottom boundary; and
   using the amplitudes of said reflected signals, after they are corrected for said reflection coefficients, to determine said logarithm.

References Cited
UNITED STATES PATENTS

| | | | |
|---|---|---|---|
| 3,270,316 | 8/1966 | Walker | 340—15.5 AC |
| 3,292,143 | 12/1966 | Russell | 181—.5 BH |
| 3,208,548 | 9/1965 | Levin et al. | 340—15.5 AC |
| 3,412,373 | 11/1968 | Ellis | 340—15.5 TC |
| 3,217,828 | 11/1965 | Mendenhall et al. | 340—15.5 TC |

BENJAMIN A. BORCHELT, Primary Examiner

N. MOSKOWITZ, Assistant Examiner

U.S. Cl. X.R.

340—15.5 AC